(12) United States Patent  
Parks et al.

(10) Patent No.: US 6,528,766 B1
(45) Date of Patent: Mar. 4, 2003

(54) COMBINATION BABY BOTTLE AND BABY WIPES CONTAINER WITH INTEGRAL WARMER

(76) Inventors: Richard C. Parks, 780 Spruce Ave., Apt. 18, Upland, CA (US) 91786; Kenneth Tarlow, 21 Golden Mind Passage, Corte Madera, CA (US) 94925

( * ) Notice: Subject to any disclaimer, the term of this patent is extended or adjusted under 35 U.S.C. 154(b) by 0 days.

(21) Appl. No.: 09/236,740

(22) Filed: Jan. 25, 1999

(51) Int. Cl.$^7$ ............................................. A47G 36/26
(52) U.S. Cl. ...................... 219/386; 219/387; 219/521; 126/261; 126/265
(58) Field of Search .................. 219/385–387, 219/429, 433, 521, 528; 126/263.01, 261

(56) References Cited

U.S. PATENT DOCUMENTS

| | | | | |
|---|---|---|---|---|
| 3,804,076 A | * | 4/1974 | Fant et al. ................... | 126/261 |
| 4,810,859 A | * | 3/1989 | Anabtawi et al. ........... | 219/535 |
| 4,943,705 A | * | 7/1990 | Halloran ...................... | 219/385 |
| 5,036,178 A | * | 7/1991 | Orbach ........................ | 219/385 |
| 5,101,515 A | * | 4/1992 | Holt et al. ....................... | 2/94 |
| 5,210,396 A | * | 5/1993 | Sanders ....................... | 219/521 |
| 5,231,266 A | * | 7/1993 | Warren ........................ | 219/521 |
| 5,697,577 A | * | 12/1997 | Ogden ....................... | 242/598.6 |
| 5,738,082 A | * | 4/1998 | Page et al. ............. | 126/263.01 |

* cited by examiner

*Primary Examiner*—Joseph Pelham
(74) *Attorney, Agent, or Firm*—Gregory Smith & Associates; Carol D. Titus

(57) ABSTRACT

Combination Baby Bottle and Baby Wipes Container With integral Warmer with a lighter fluid powered heating element. A baby bottle is intimately associated with the heating element on one side. A baby wipes container is intimately associated with the heating element on the other side. A removably attachable lighter fluid container supplies fuel to the heating element. A piezoelectric push button starting mechanism activates the heating element and a push button stopping mechanism turns the heating element off. A preferred embodiment includes wherein said heating element is cylindrical in shape and said baby bottle has one surface consisting of a concave shape that intimately associates with one side of said heating element and said baby wipes container having a similar concave shape on one surface that intimately associates with the opposite side of said heating element.

17 Claims, 7 Drawing Sheets

COMBINATION BABY BOTTLE AND BABY WIPES CONTAINER WITH INTEGRAL WARMER

BACKGROUND OF THE INVENTION

This invention relates generally to the field of warming devices, and more particularly to a combination baby bottle and baby wipes container with an integral warmer.

It is a common practice for caretakers of infants to feed the infant a milk-like formula, which is poured into a bottle having a pliable nipple type closure from which the infant sucks the formula. The formula is a substitute for mother's breast milk and as such should be warmed before feeding to the infant. Bottle warmers exist today. However, these warmers need to be plugged into a wall outlet in the home.

A warmed bottle of milk could be put into an insulated carrying case for trips away from home however even with the best insulation eventually the temperature cools. Therefore, there is a need for a portable heating means for a baby bottle when traveling away from home.

Additionally, within the last thirty years, mothers have been using disposable baby wipes to clean an infant's bottom or other parts needing cleaning. These wipes are made of a paper material and are slightly moist and stored in an airtight container. Because of the moisture content of the wipes, they tend to be cool to the touch. This coolness can cause an infant some discomfort resulting in an unhappy child. Ideally the wipes should be warmed to body temperature so that there is no shock when the wipe is applied the infant's bare body. When at home, a child-care provider could put the wipe container over a hot surface such as a hot plate and thereby warm the wipes in the container. Currently, there is no portable baby wipe warmer available that can be easily carried by a parent or other child-care provider and used while away from home.

SUMMARY OF THE INVENTION

The primary object of the invention is to provide a combination baby bottle and baby wipes container that can is portable and can be warmed.

Another object of the invention is to provide a portable warming device that is integral with and can warm a baby bottle and a baby wipes container at the same time.

Another object of the invention is to provide the baby bottle, wipes container and warming device in one integrated shape that can be easily used and carried in a bag with other baby products such as diapers and the like.

Other objects and advantages of the present invention will become apparent from the following descriptions, taken in connection with the accompanying drawings, wherein, by way of illustration and example, an embodiment of the present invention is disclosed.

A combination baby bottle and baby wipes container with integral warmer comprising: a lighter fluid powered cylindrical heating element, a heating element holding housing, a baby bottle having one concave surface and intimately associated with the heating element on one side, a baby wipes container having one concave surface and intimately associated with the heating element on the other side, a removably attachable lighter fluid container, a piezoelectric push button starting mechanism and a push button stopping mechanism.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
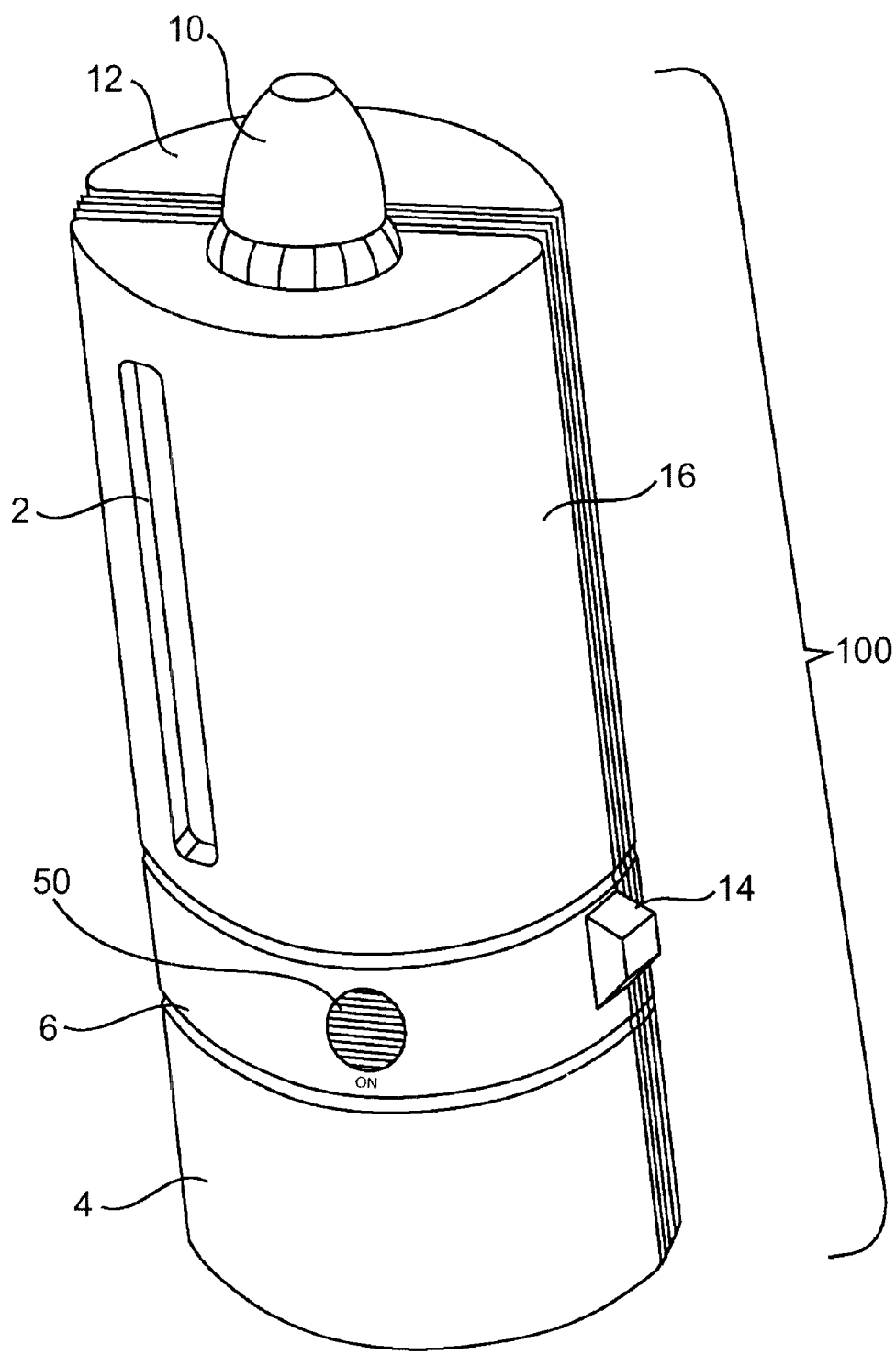
FIG. 1 is a perspective view of the bottle side of the combination baby bottle and wipes container of the present invention.

Referring now to FIG. 1 we see a perspective view of the combination baby bottle and wipe container with integral warmer 100. The bottom section 4 contains liquid fuel such as lighter fluid. The middle section 6 is the housing for anchoring the internal heating element and is split into two halves, one being a baby bottle 16 and the other being a baby wipes container 12. Baby bottle 16 has an integral handle 2 molded in place for easy gripping by an infant. Bottle 16 terminates at its top most portion in a removable cap 10, which protects a nipple 36 housed inside.

Figure 2:
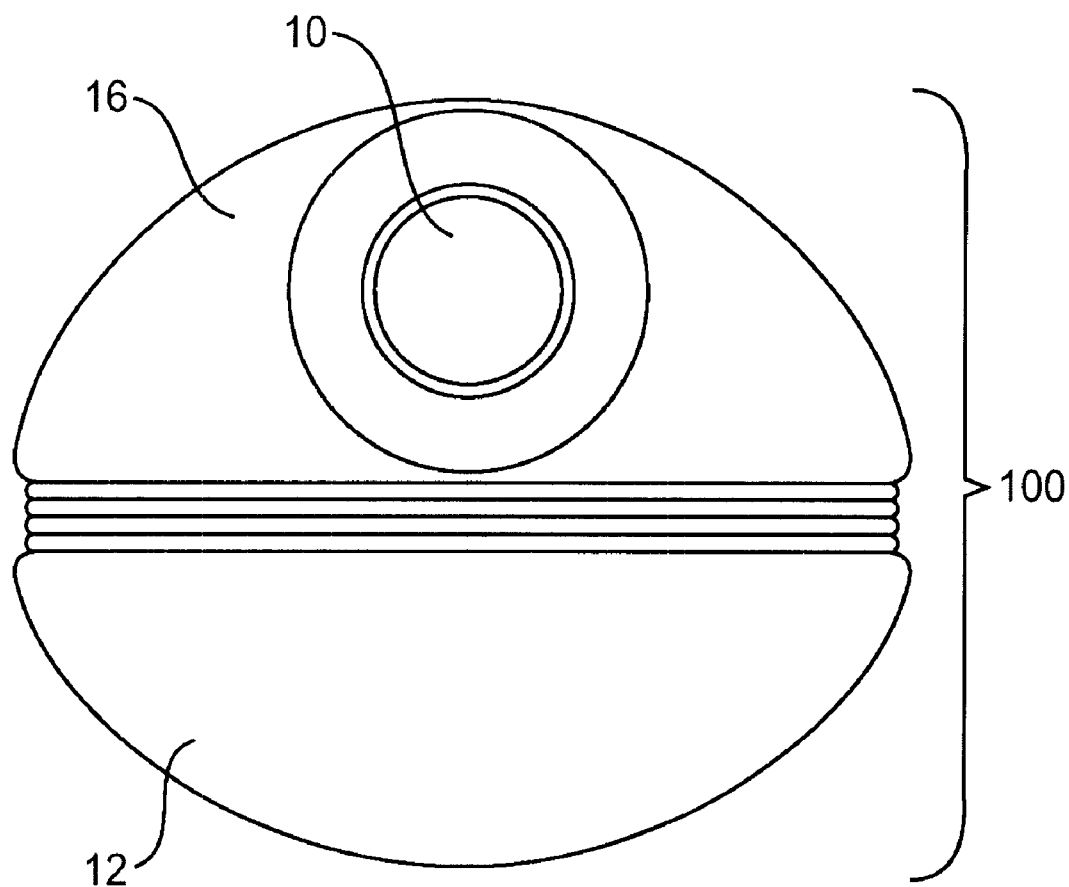
FIG. 2 is a top view of the present invention.

FIG. 2 shows a top view of the present invention 100 showing the wipe holding half 12 and the baby bottle half 16. Nipple cover 10 is centered on the baby bottle half 16.

Figure 3:
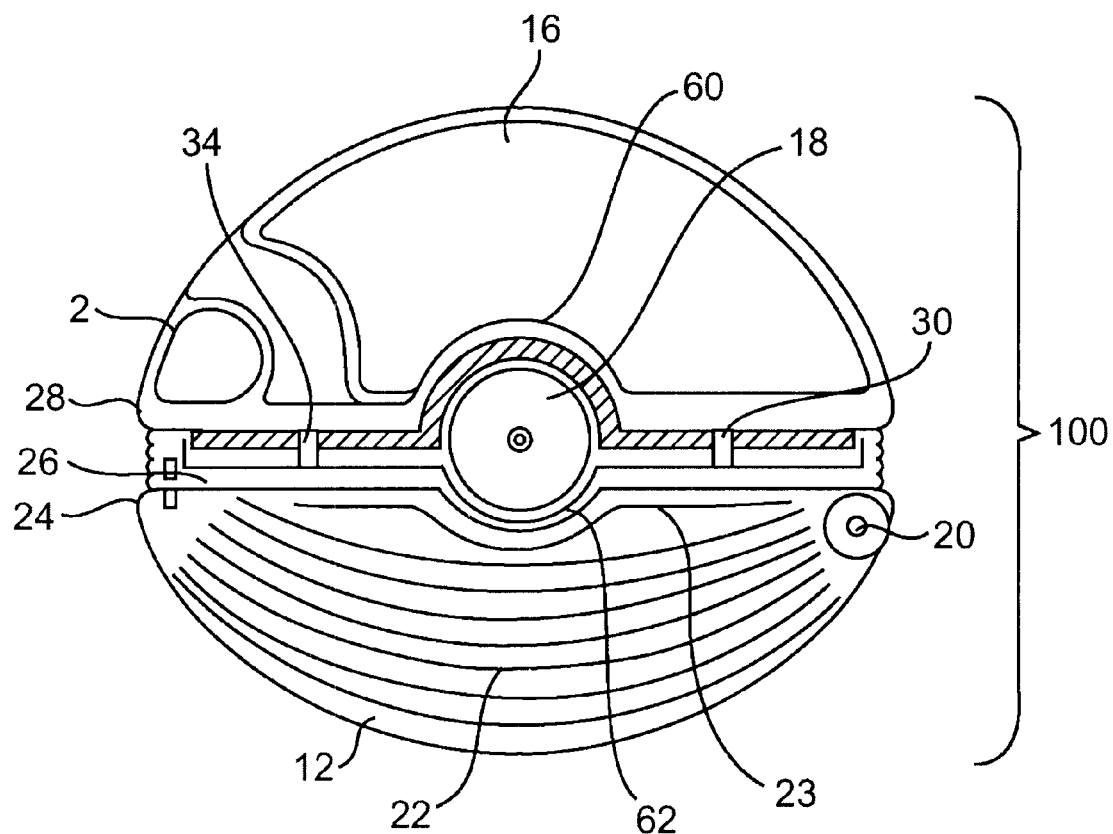
FIG. 3 is a top section view of the present invention.

FIG. 3 shows a top section view of the present invention 100. Heater element 18 is at the center of the unit 100. Heater element 18 is similar to the heating element that is common to many hair curlers such as the Conair model CA0262A made by Conair Corporation of East Windsor, N.J. Baby bottle 16 snaps onto aluminum plate 28 by integral posts 30 and 34. Aluminum plate 28 spreads the heat generated by heater 18 to intimately associated surfaces 60, 62. Surface 60 is one side of the baby bottle 16 and surface 62 is one side of the baby wipes container 12. Hinge 20 allows the outer surface of the wipes holder 12 to open thereby bringing to view the baby wipes 22 contained inside. Wipe 23 is the first wipe that comes to view and is the warmest since it is closest to aluminum heat plate 28. Baby bottle 16 is molded of an FDA approved, high temperature resistant plastic such as polycarbonate so that it can withstand the heat given off by heater 18 which is approximately 150 F. degrees.

Figure 4:
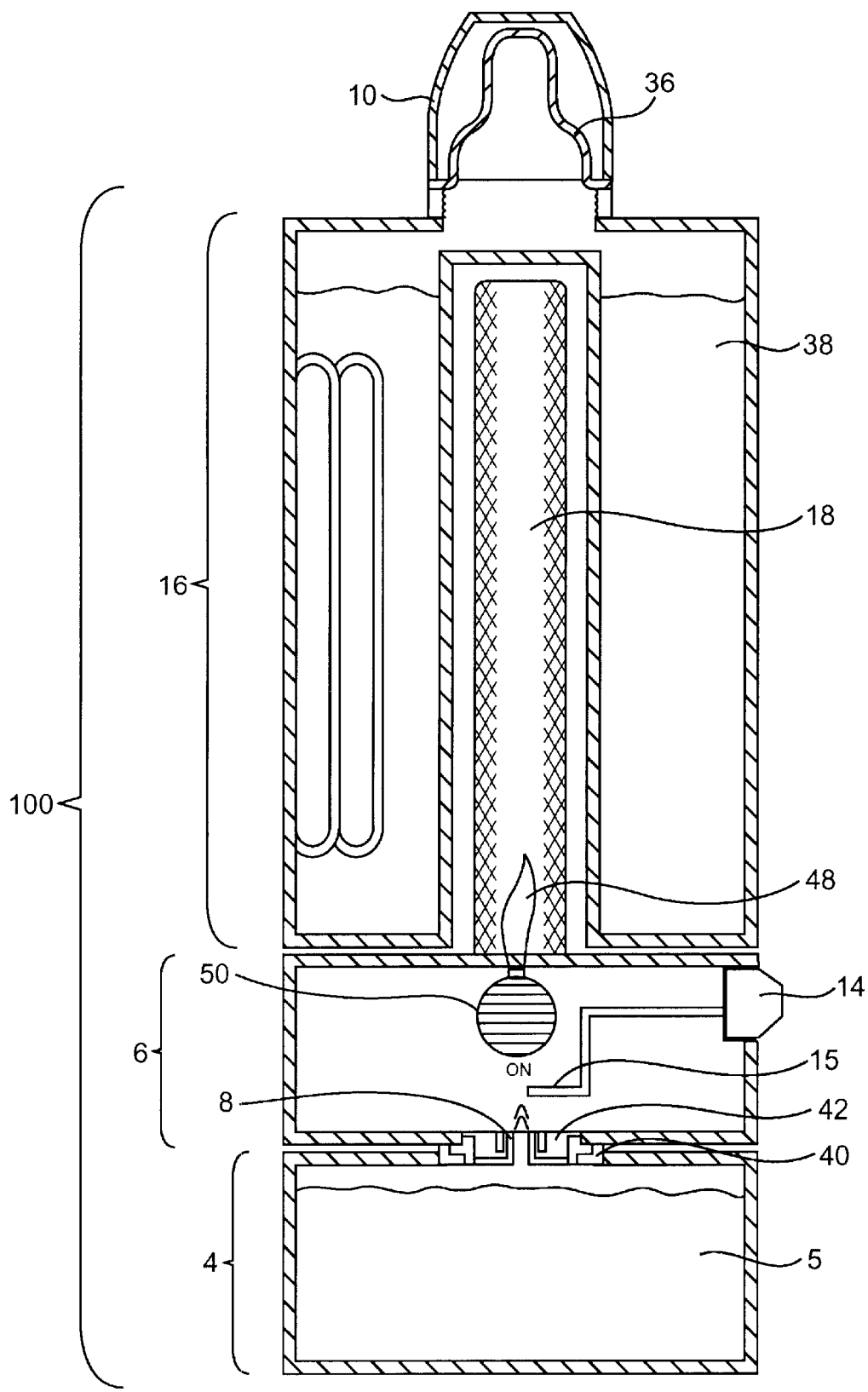
FIG. 4 is a front section view of the present invention.

FIG. 4 shows a side section view of the present invention. The heater portion 18 is shown as a tall cylindrical member and is associated with a piezoelectric sparking member 15, which is turned on by push button 14. Fuel 5 is supplied to heater 18 through orifice 8, which leads to fuel reservoir 4. The entire fuel storage, activation and heater mechanism is based on the mechanism found in portable hair curlers, which use liquid fuel. An alternate embodiment can be made in which the heating element is an electric resistance type element powered by batteries. Milk or formula 38 is housed in bottle 16.

Figure 5:
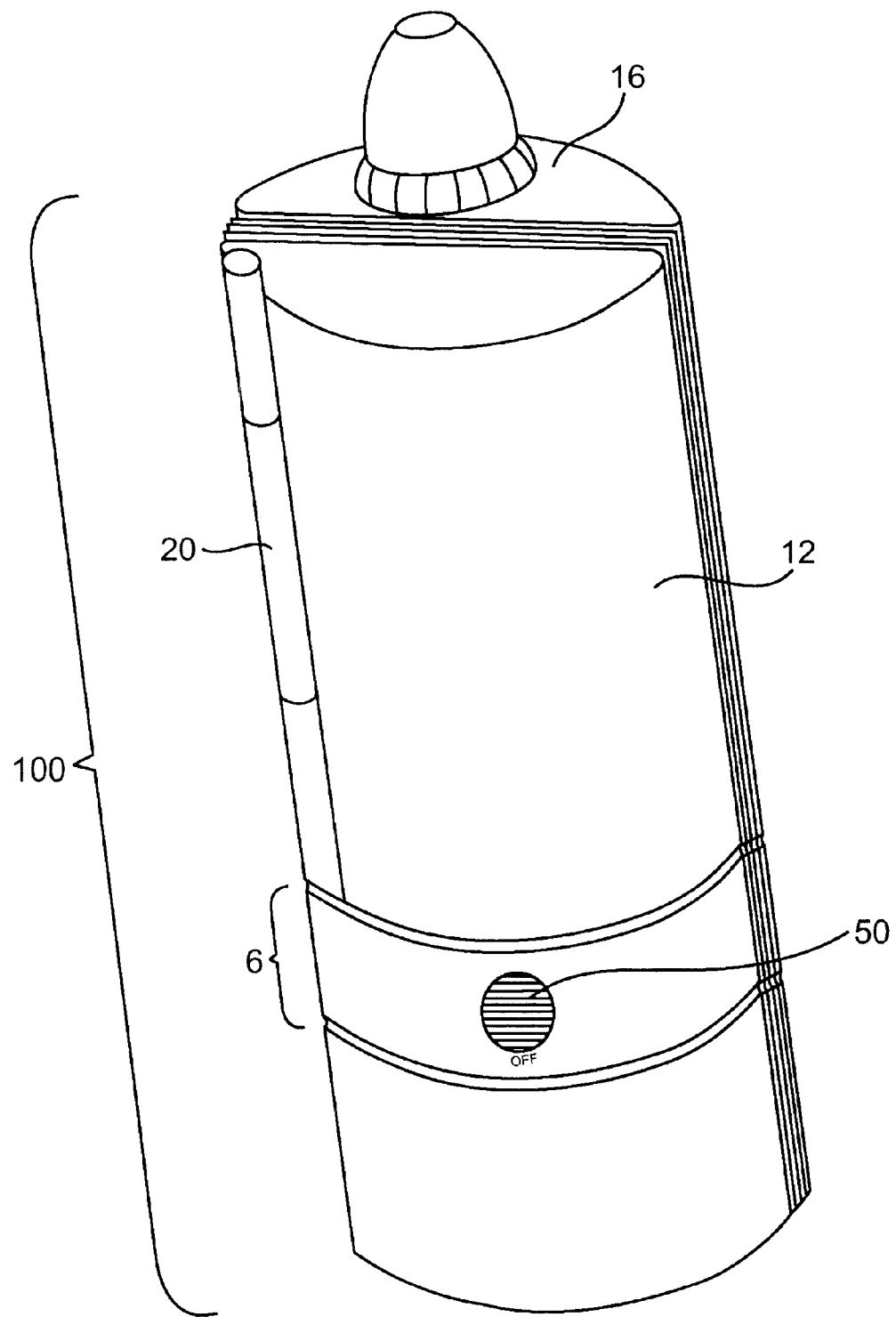
FIG. 5 is a perspective view of the wipes container side of the present invention.

FIG. 5 shows a perspective view of the present invention 100 showing the wipe container 12 side. Off switch 50 is located in the heater holding portion 6 and is used to turn off the flow of fuel to the heating element as is found in portable hair curlers which use liquid fuel.

Figure 6:
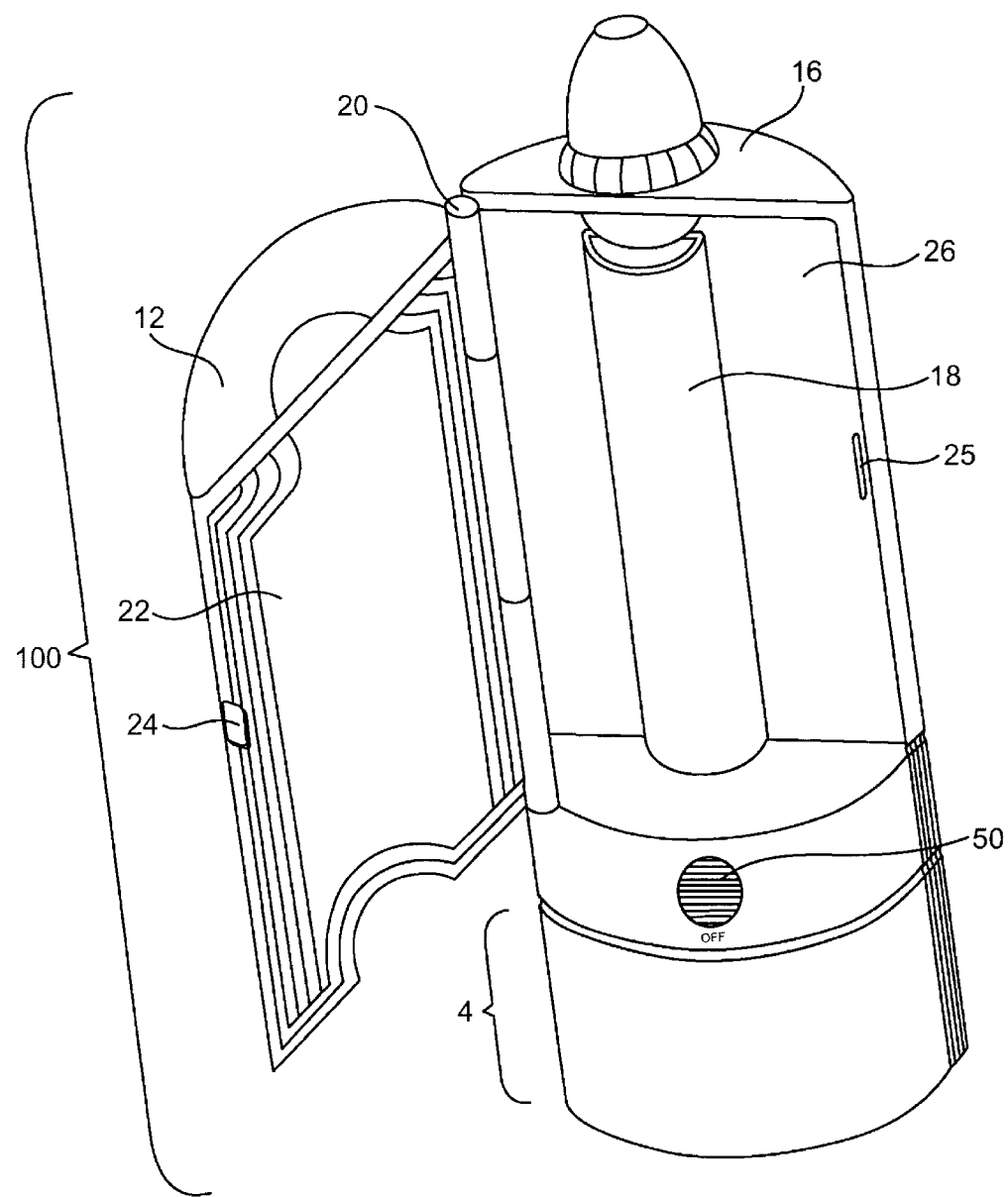
FIG. 6 is a perspective view of the wipes container in an open position.

FIG. 6 shows a perspective view of the present invention 100 with the wipe holding container 12 in the open position. Wipes 22 can be easily removed. Latch 24 mates with catch 25 to close the container 12. Hinge 20 allows the wipe container 12 to swing open. Aluminum heat sink 26 spreads the heat to warm the entire surface of wipe 22. The heat emanated from heat sink 26 is enough to warm at least the first four wipes 22 closest to the heat sink 26. Container 12 is relatively airtight when in the closed position to prevent the moisture impregnated in the wipes 22 from drying out.

Figure 7:
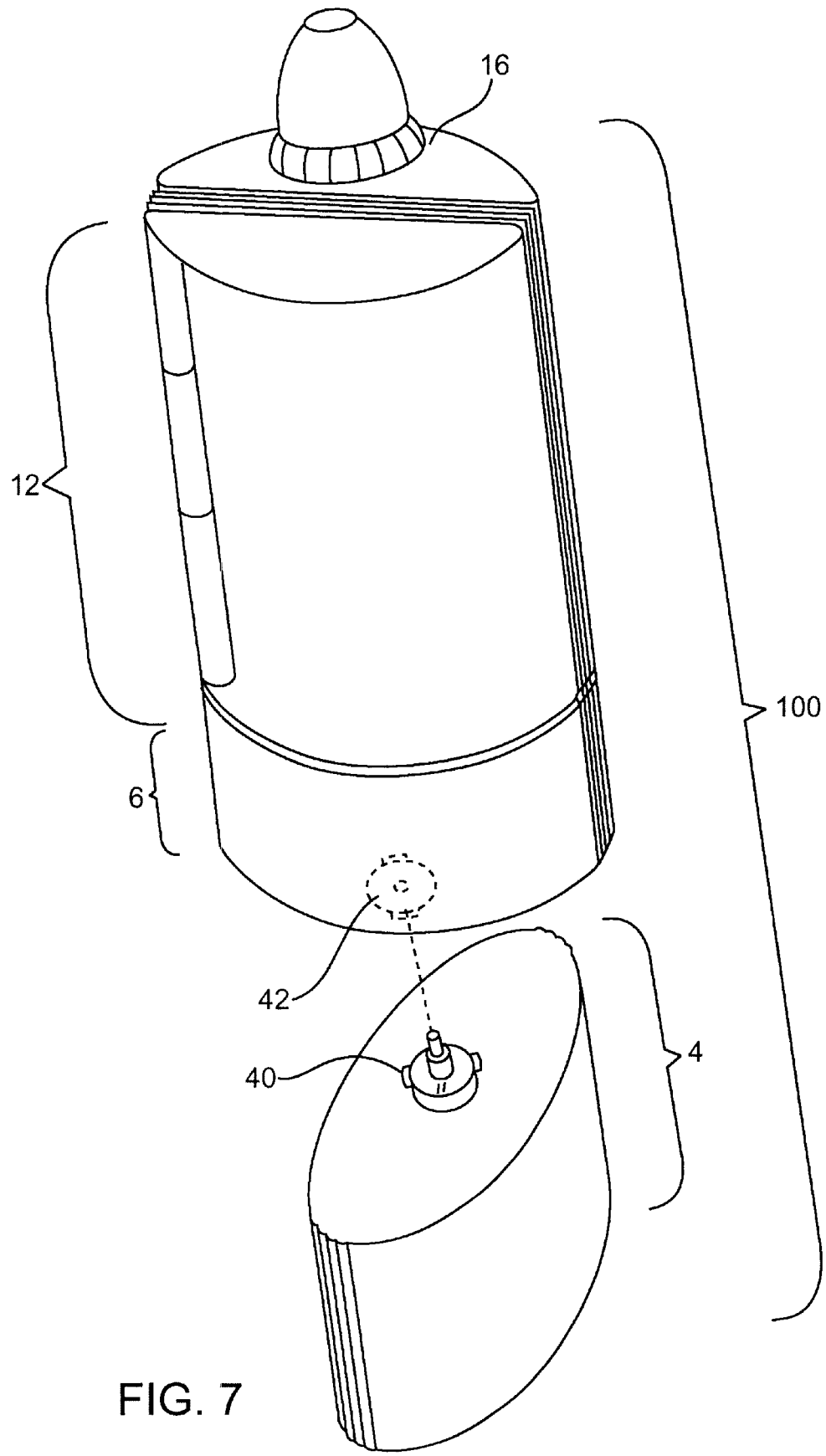
FIG. 7 is a perspective view of the attachment means for the lighter fluid reservoir.

FIG. 7 is a perspective view of the present invention 100 showing how the liquid fuel holding portion 4 is attached to the heater holding portion 6. Bayonet flanges 40 located at the top of the fuel holding container 4 mate with a matching bayonet assembly 42 located at the base of heater holding portion 6. In this way, a user can detach the fuel holding portion 4 and reattach a new full container when necessary.

As the above description implies, a mother or child-care provider can use the present invention 100 while away from home or at home and, by using the present invention 100, can have warm milk or formula as well as warm baby wipes when ever and where ever necessary. The compact, integrated shape allows a user to easily pack the device into a carrying bag along with other baby care items.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A baby bottle and baby wipes container with integral warmer, comprising:

a heating element;

a housing containing said heating element, a baby bottle intimately associated with the heating element on one side;

a baby wipes container intimately associated with the heating element on the other side;

a piezoelectric push button starting mechanism and a push button stopping mechanism.

2. The baby bottle and baby wipes container with integral warmer as claimed in claim 1 wherein said heating element is cylindrical in shape and said baby bottle has one surface consisting of a cylindrically concave shape that intimately associates with one side of said heating element and said baby wipes container having a similar cylindrically concave shape on one surface that intimately associates with the opposite side of said heating element.

3. The baby bottle and baby wipes container with integral warmer as claimed in claim 1 wherein said lighter fluid container removes and attaches from the underside of said heating element by a bayonet type attaching means.

4. The baby bottle and baby wipes container with integral warmer as claimed in claim 1 wherein said piezoelectric starter is activated by a push button on the outside of said heater element housing.

5. The baby bottle and baby wipes container with integral warmer as claimed in claim 1 wherein said off switch is located on said heating element housing opposite said piezoelectric push button.

6. The baby bottle and baby wipes container with integral warmer as claimed in claim 1 wherein said heating element is comprised of an electric resistive element and is powered by batteries.

7. The baby bottle and baby wipes container with integral warmer as claimed in claim 1 wherein said heating element is a lighter fluid powered heating element, and further comprising a removable attachable lighter fluid container connected to said heating element.

8. A baby bottle and baby wipes container with integral warmer, comprising:

a housing having a first cavity and a second cavity, said first cavity forming an enclosure suitable for holding fluid, said second cavity forming an enclosure suitable for holding baby wipes, a heater located in said housing, and located and configured to warm the fluid within said first cavity and the baby wipes located in said second cavity, a starting mechanism for starting said heater, and a stopping mechanism for stopping said heater.

9. The baby bottle and baby wipes container with integral warmer of claim 8, wherein said heater includes a heat sink configured to distribute heat into said first and second cavities.

10. The baby bottle and baby wipes container with integral warmer of claim 8, wherein said heater includes a heating element heated by burning of a liquid fuel from a liquid fuel reservoir.

11. The baby bottle and baby wipes container with integral warmer of claim 10, wherein said liquid fuel reservoir is detachably attached to said housing.

12. The baby bottle and baby wipes container with integral warmer of claim 10, wherein said liquid fuel reservoir is attachable to said housing with a bayonet type attaching means.

13. The baby bottle and baby wipes container with integral warmer of claim 8, wherein said starting mechanism includes a piezoelectric starter.

14. The baby bottle and baby wipes container with integral warmer of claim 8, wherein said heater includes an electric resistive element located at least partially within said housing.

15. The baby bottle and baby wipes container with integral warmer of claim 14, wherein said electric resisitive element is powered by batteries.

16. The baby bottle and baby wipes container with integral warmer of claim 8, further comprising a nipple connected to said first cavity.

17. The baby bottle and baby wipes container with integral warmer of claim 8, wherein said first and second cavitites are pivotally connected by a hinge.

* * * * *